UNITED STATES PATENT OFFICE.

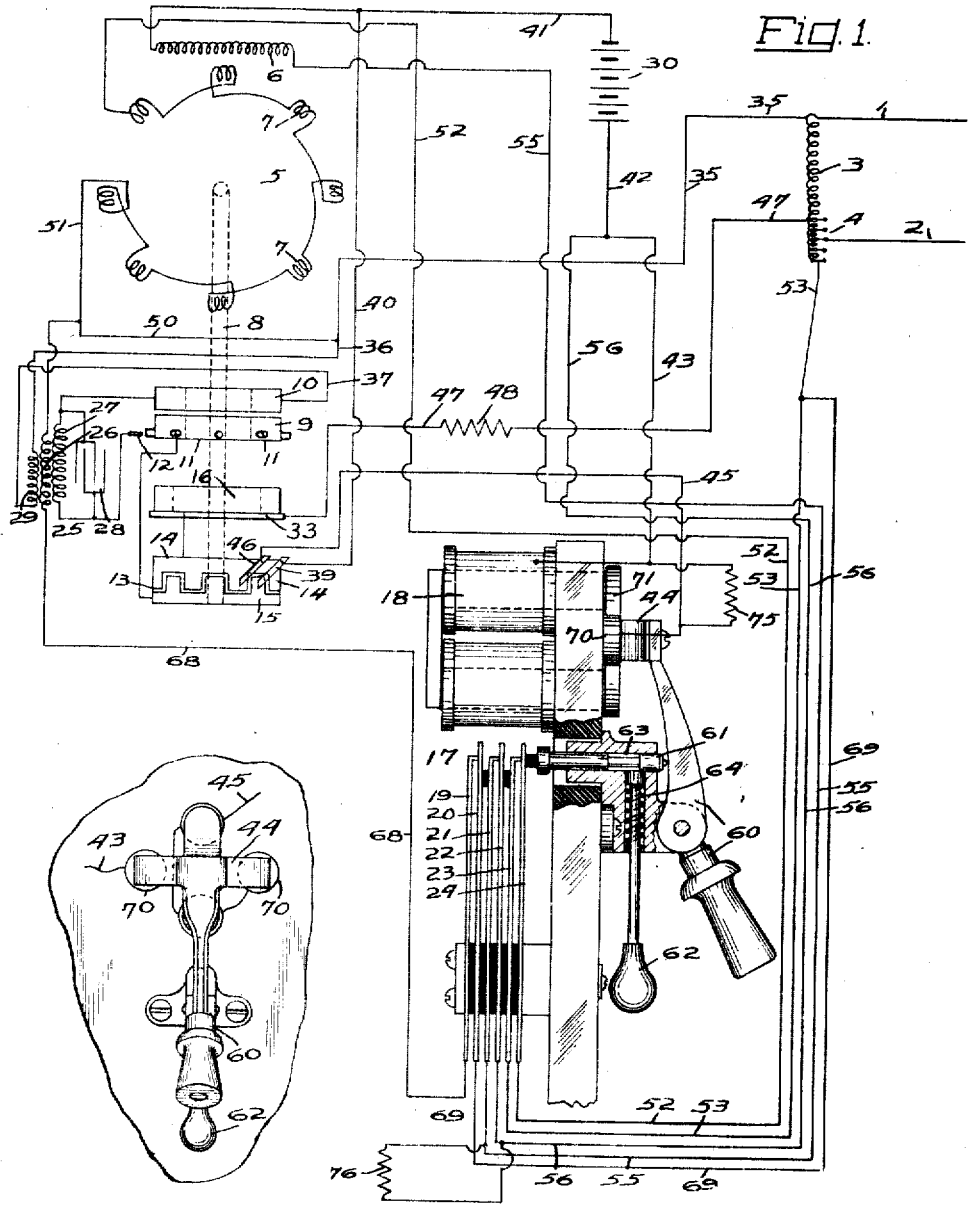

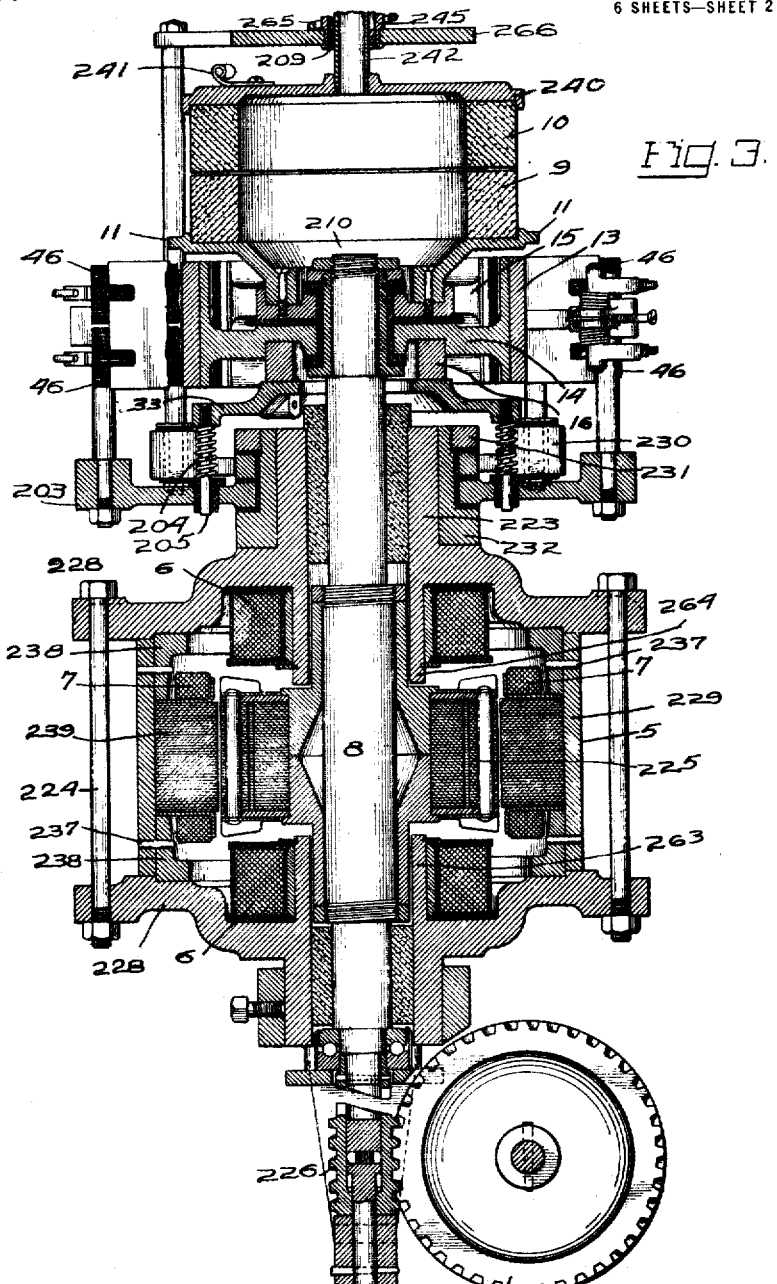

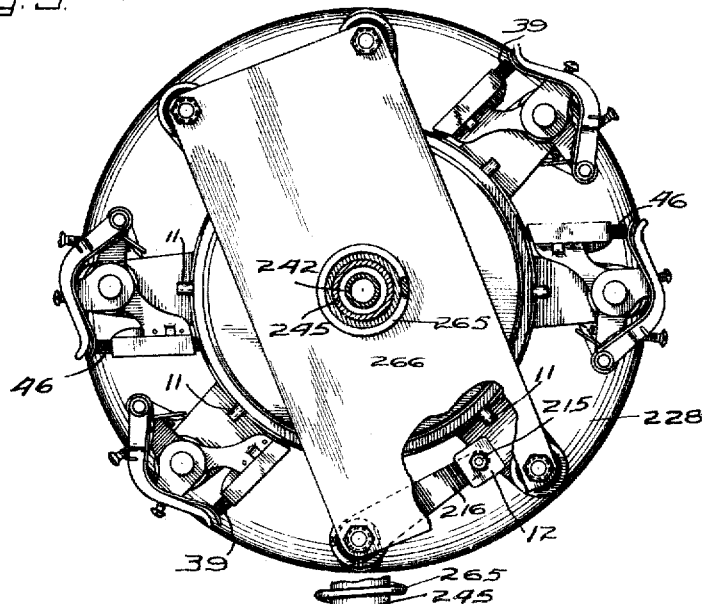
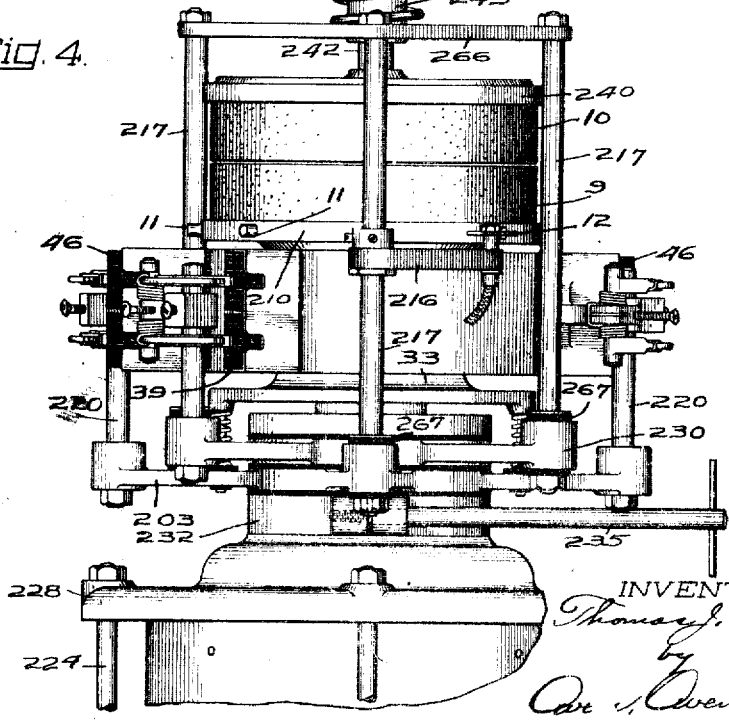

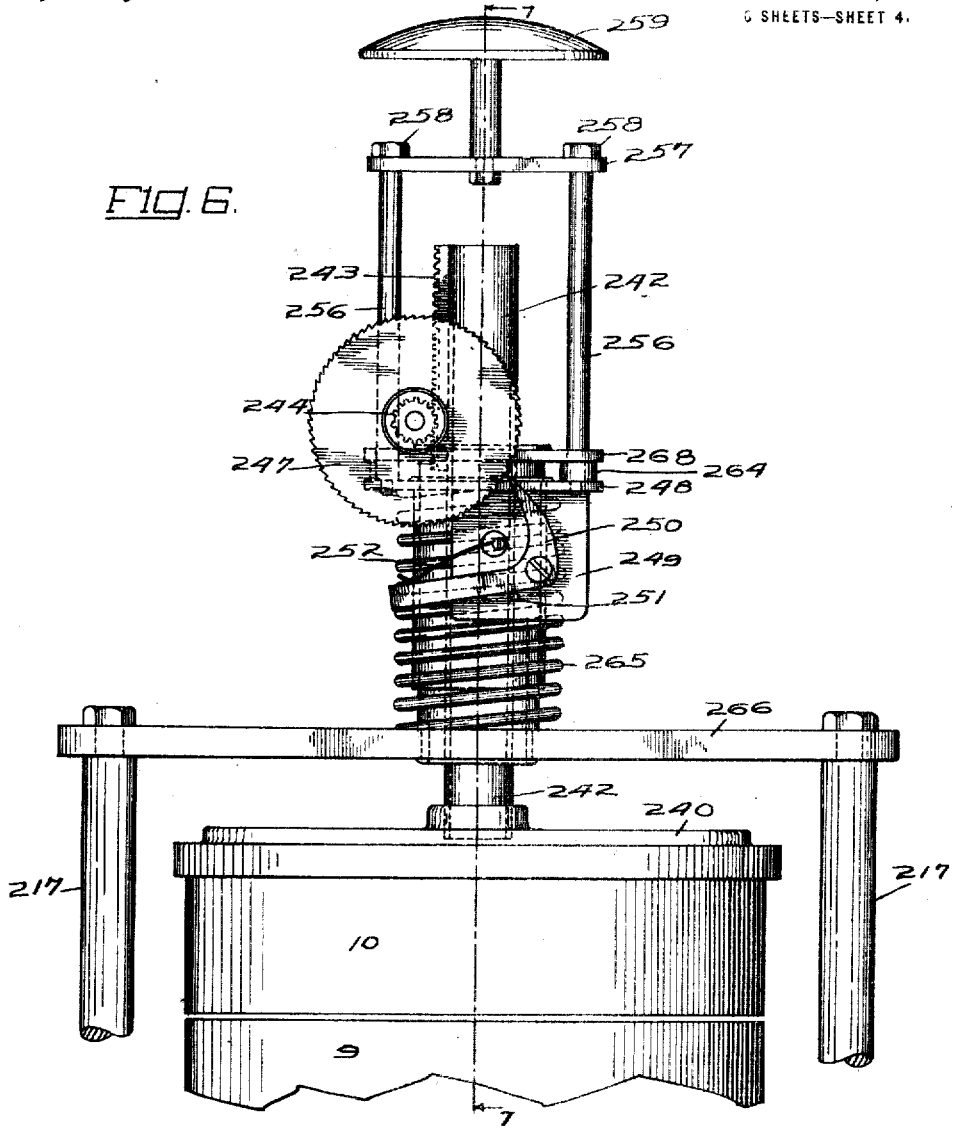

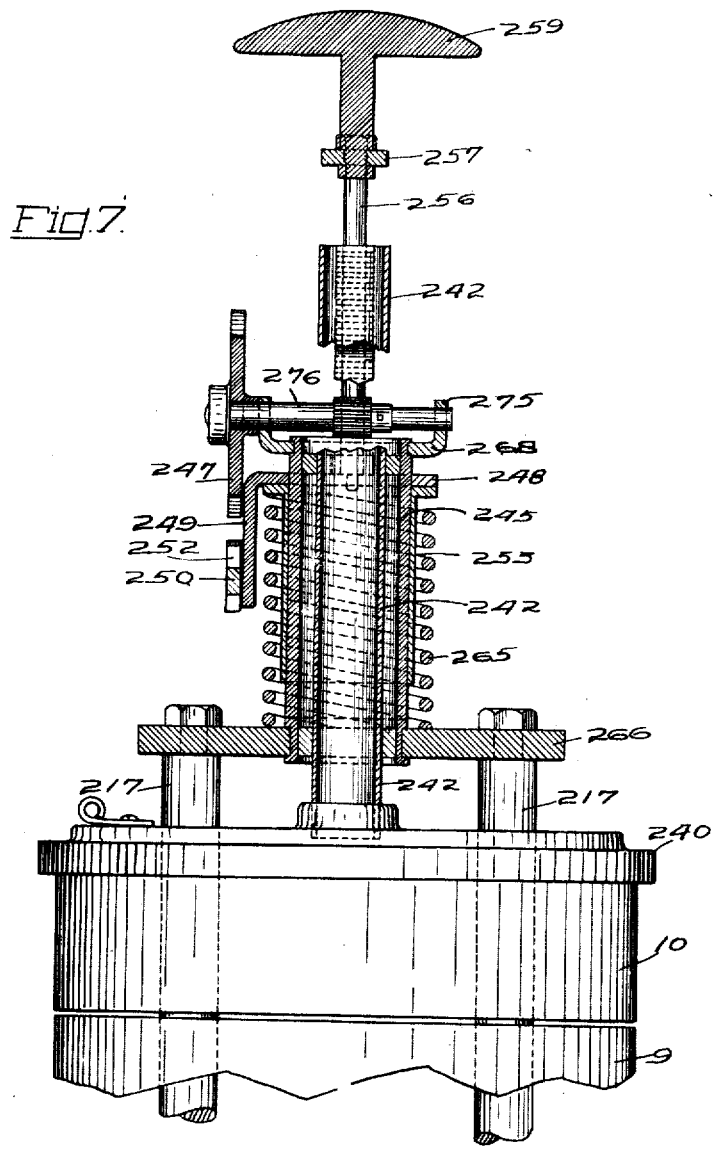

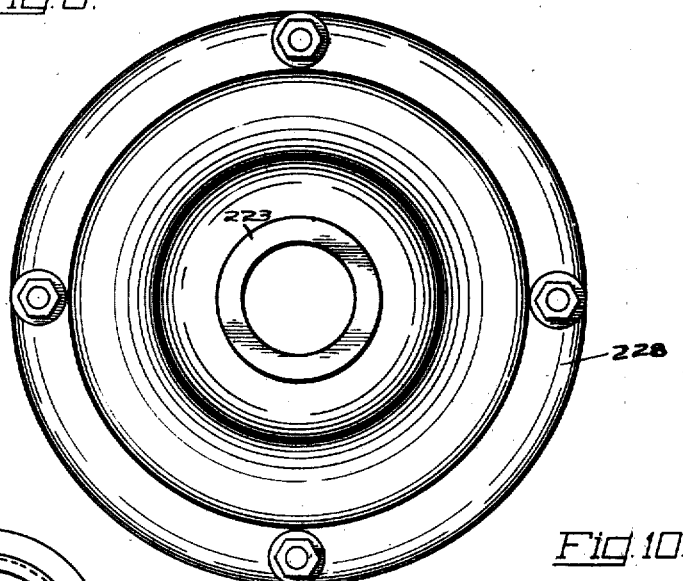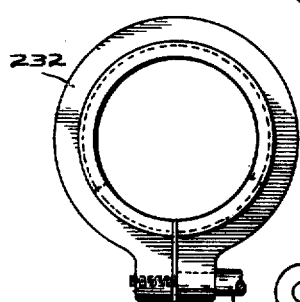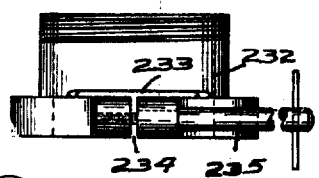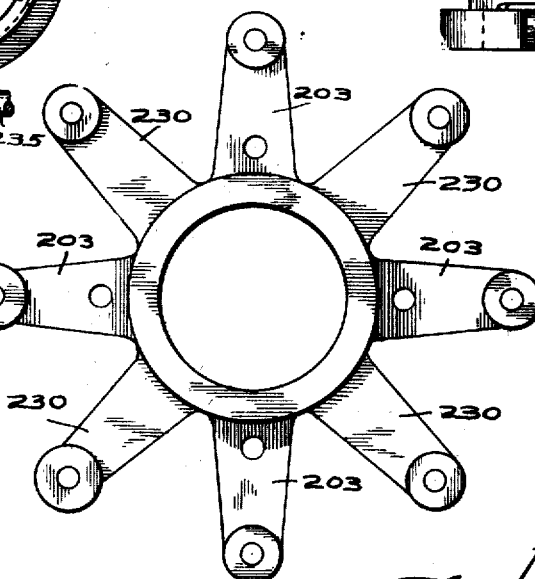

THOMAS J. MURPHY, OF ROCHESTER, NEW YORK, ASSIGNOR OF ONE-HALF TO JAMES P. B. DUFFY, OF ROCHESTER, NEW YORK.

ALTERNATING-CURRENT RECTIFIER.

1,268,795.    Specification of Letters Patent.    Patented June 4, 1918.

Application filed June 17, 1916. Serial No. 104,273.

*To all whom it may concern:*

Be it known that I, THOMAS J. MURPHY, a subject of the King of Great Britain, and a resident of Rochester, in the county of Monroe and State of New York, have invented a certain new and useful Alternating-Current Rectifier; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to alternating current rectifiers, and it has for its object to provide an electricity rectifier wherein the current rectified will be substantially constant in potential.

The invention also has for its object to provide a rectifying apparatus which will be efficient and yet may be made at a low cost and may be easily assembled. A further object of the invention is to provide a rectifying commutator having in connection therewith an arc gap for controlling the flow of the current with reference to the counter electro-motive forces in the rectified circuit. It also provides means for controlling the starting of the arc as by a high potential or static discharge across the gap.

The invention also has for its object to provide means for readily adjusting the potential of the current rectified according to the potential impressed by the source of supply. A further object of my invention is to provide a rotating electrode secured to the shaft of the motor which synchronously drives the commutator. It also has for its object to provide spark points or terminals which are also connected to the shaft of the motor and are moved with the commutator. In my invention the rotating terminals correspond in number with the bars of the commutator.

My invention also has for its object to produce a rectifier apparatus wherein the potential will be substantially constant. It also has for its object to provide an arcing means which automatically controls the periods in which the arcs are formed with reference to the periodicity of the current and with reference to a commutator with which the arcing means may be connected.

By my invention is provided an auxiliary commutator supplied by a low potential coil and by a transformer for field excitation of the synchronous motor. My invention also provides a low potential coil in a transformer which is connected to the armature for the purpose of simplifying the insulation, while high potential current is rectified, which is supplied to translating devices of the system.

By my invention is also produced a rectifying apparatus wherein the commutator brushes are supported on insulated spiders, thus avoiding the necessity of supporting the brushes in fibrous bearings to avoid the increasing looseness of such bearings when supported in insulating bearings. By my invention is also provided an apparatus whereby the vertical thrust of the revolving elements of the synchronous motor is greatly eliminated. My invention also provides a synchronous motor which may be readily assembled and the laminated parts clamped together. By my invention is also produced a means for separating the electrodes of the arcing means automatically a predetermined distance, notwithstanding the wear or burning of the electrodes or irregularities that may be formed on opposing points, edges, or faces of the electrodes. Other features and advantages are provided and will appear or suggest themselves from the following description and the illustration of an embodiment of the invention.

The invention may be contained in many forms of constructions usable for different purposes, all of which come within the purview of my claims hereinafter appended. To show the practicability of my invention I have selected one of such constructions as an example and shall describe it hereinafter. The construction selected is illustrated in the accompanying drawings.

Figure 1 illustrates diagrammatically a system showing the connections of the parts of the apparatus involving one form of my invention. Fig. 2 illustrates a switch shown in Fig. 1 showing connections of a magnet for controlling the switch. Fig. 3 is a vertical sectional view of a motor and parts connected to its shaft. Fig. 4 is a side view of a part of the construction shown in Fig. 3. Fig. 5 is a top view of the structure shown in Fig. 4, the structures shown in Figs. 3, 4 and 5 being shown as broken at the upper end in order that the structure may be clearly shown on the drawing. Fig. 6 illustrates a side view of the upper part of the structure. Fig. 7 illustrates a sectional view of the portion of the structure illustrated in Fig. 6. Fig. 8 is a top view of one of the end plates which incloses the motor. Fig. 9 is a top view of a clamping sleeve. Fig. 10 is a side view of the sleeve shown in Fig. 9. Fig. 11 shows a pair of spiders for insulatingly supporting the upper structure on the apparatus shown in the other figures.

In Fig. 1 is shown diagrammatically the apparatus. 1, 2 are the main lines which supply the current. 3 is a booster transformer which is connected to the lines 1 and 2. Means is provided for adjusting the booster transformer to vary the potential that is obtained in the derived circuit. The booster transformer is provided with a plurality of taps 4, any one of which may be connected with the line 2 so as to connect between the lines 1 and 2 coils varying in number according to the potential that is to be produced in the derived circuit. The object of making the booster adjustable is to provide for a definite number of cells that may be contained in the storage battery which is to be charged by the rectified current.

From the booster or line transformer 3 connection is made with the rectifying apparatus. The rectifying apparatus has a synchronous motor 5 having a direct current field coil 6 and alternating current armature coils 7. The motor 5 is connected by means of a shaft 8 to a rotating electrode 9 which is placed in proximity to a stationary electrode 10. The rotating electrode 9 is provided with a plurality of spark points 11 which move in succession in proximity to a stationary spark point or terminal 12. The terminal 12 is preferably rectangular in form and so as to give an appreciable time in which the current may be established while the spark points 11 are passing the terminal 12. A commutator 13 having the dove-tailed commutator parts 14 and 15 are also connected to the shaft 8. A suitable means may be used for connecting the commutator part 14 with an external circuit such as the slip ring 16 and the contact brush or disk 33 which is connected to the commutator part 14. A suitable switch such as the compound switch 17 may be used for manipulating the circuits connected to the various parts of the rectifying apparatus. The switch 17 may be electro-magnetically controlled as by the magnets 18. It is also provided with a plurality of contacts 19, 20, 21, 22, 23 and 24, which are closed by the operation of the switch to complete circuits of the system. Automatic means is provided for locking the switch open once it has been released by the magnet 18. A source of high potential current for producing a discharge across the spark terminals 11 and 12 and across the electrodes 9 and 10 is provided. The source of high potential current is produced by the transformer 25 having a primary coil 26 which may be connected to the source of current supply. The transformer 25 is provided with a secondary 27 having a large number of turns relative to the primary 26 to produce a high potential current. A condenser 28 is connected to the terminals of the high potential secondary 27. The condenser 28 is charged by the current induced in the secondary coil 27 until it is discharged by the spark points 11 coming into proximity or in opposition to the spark points 12. The transformer 25 is provided with a demagnetizing coil 29 having a relatively few turns of large wire to practically eliminate the potential induced in the coil 27 by the coil 26 when the spark points 11, 12 and the electrodes 9, 10 have performed their function of establishing an arc. For when an arc is established between the electrodes 9 and 10 the current will flow through the coil 29 in a direction opposite to that through which the current flows through the coil 26, which will operate to counteract the effect of the coil 26 on the secondary coil 27. This will prevent further formation of sparks across the spark points 11, 12 and the electrodes 9, 10 until the current through the coil 29 ceases.

The rectified current may be directed to any number of translating devices and the current may be used for any purpose for which such a current may be used. In the figure the rectified current is directed to a storage battery 30 which is charged by the rectified current. The system shown in the figure is particularly designed for battery charge purposes.

The booster transformer 3 is connected to the stationary electrode 10 by means of the wires 35, 36 and 37, and through the coil 29. The electrode 9 which is located in juxtaposition to the electrode 10 is connected to the commutator part 15. Thence the current passes through the brush that is in contact with the commutator part 15, such as the brush 39, which is connected by means of the wires 40 and 41 to the battery 30, whence it passes to the switch 17 by means of the wires 42 and 43, and through the main contact 44 of the switch 17. Thence the current passes through the wire 45 to the other brush 46 which is in contact with the other commutator part 14 of the commutator. Whence the current returns to the booster transformer through the wire 47 and a ballast resistance 48 to prevent a too sudden rise of current upon closing the circuits.

The booster transformer 3 is also connected to the motor 5 by means of the wires 35, 50 and 51. It passes through the armature field coils 7 and returns through the wire 52. It passes to the switch 17 and through the contact 24, thence to the contact 23 and through the wire 53 to the end terminal of the booster coil 3. This impresses a relatively high potential upon the armature coils 7. This potential may be made substantially the same wherever the apparatus may be installed, although the potential of the line may be found to vary in the different localities. The connection of the line 2 with the taps 4 may be varied to produce the desired potential between the line 35 and the line 47 and between the line 35 and the line 53.

The field coil 6 of the motor 5 may be connected with a source of direct current supply such as the storage battery 30. In the system shown one terminal of the field coil 6 is connected to the battery 30 by means of the line 41. The other terminal of the field coil 6 is connected to the battery through the line 55 to the contact 21 of the switch 17, thence it passes to the contact 22 through the wires 56 and 42 to the battery 30.

The direct current field coils and the alternating current armature coils being energized respectively from the battery 30 and the auto transformer 3 cause the rotation of the shaft 8, the commutator and the spark terminals 11, in synchronism with the current changes.

The spark terminals 11 pass the spark terminal 12 when the potential of the line reaches a predetermined point depending upon the location of the spark terminal 12 relative to the shaft 8. The location of the spark terminal 12 is determined by the counter electro-motive forces of the circuit through which the rectified current passes. In charging a storage battery such as the battery 30, the spark point 12 is so located that the spark point 11 will pass it when the potential reaches a point slightly above the potential of the battery 30. Whereupon the spark terminals will permit a discharge of the condenser 28, which is charged by the secondary coil 27 of the transformer 25, across the electrodes 9 and 10 as well as across the terminals 11 and 12. This permits an arc to be established across the electrodes 9 and 10 which are connected to the booster transformer 3 through the lines 35, 36, 37, the commutator, the commutator brushes and the lines and instrumentalities connected in series with the brushes and the line 47. The arc will be maintained between the electrodes 9 and 10 until the potential of the current falls to and becomes equal to the counter electro-motive forces of the instrumentalities found in the circuit, as in this case, that of the storage battery 30. The arc will then cease and the current will discontinue in its flow across the electrodes to the translating devices, such as to the storage battery 30.

The current will thus flow during the high potential periods of the wave. As soon as the arc is established across the electrodes 10 and 9 and the current flows through the arc and the electrodes, it also flows through the coil 29 which is in series with the electrodes 10 and 9. The coil 29 is so wound or connected as to counteract the effect of the coil 26 on the condenser charging coil 27. It immediately causes a cessation of the sparking which would otherwise be produced between the terminals 11 and 12. The sparking will thus continue across the terminals 11 and 12 until the arcs are established across the electrodes 9 and 10, and when once the arcs are established the sparking will cease.

The sparking terminal 12 is also so located relative to the shaft 8 such that sparks will be produced between the terminals 11 and 12 when the brushes 39 and 46 have passed the leading edges of the dove-tailing portions of the commutator parts 14 and 15, so that no arcs will be formed until the brushes are well upon the dove-tailing portions of the commutator parts. This entirely avoids any arcing between the commutator parts and the brushes. The brushes 39 and 46 are also so located with reference to the commutator parts 14 and 15 that the potential of the current will be about equal to or slightly below the counter electro-motive forces of the circuit connected to the brushes, when the brushes pass from the dove-tailing portions of one of the commutator parts to the dove-tailing portions of the other of the commutator parts. By this means a perfect rectification of the current is obtained and there is no short circuiting of the battery, arcing of the brushes, or return of the current.

A number of the circuits are controlled by the switch 17. The circuits are closed by the operation of the lever arm 60. The switch lever operates upon a plunger 61. The plunger 61 in turn operates on the circuits that are connected to the contacts 19 to 24 inclusive to close pairs of the contacts in sequence. The plunger 61 is provided with a recessed portion 63. A plunger 62 is operated at right angles to the movements of the plunger 61 by the spring 64 and when the plunger 61 is pushed out by the elasticity of the spring contacts the head of the plunger 62 is pressed into the recess 63. The recess 63 is of sufficient length to permit of some movement of the plunger 61 and so as to close the circuit between the first two pairs of contacts, that is operated upon by the plunger 61, but the plunger 62 prevents further movement of the plunger 61. When the motor is operating so as to rectify the alternating current, the plunger 62 may be pulled from the recess 63 which will permit the switch lever 60 to move the plunger 61 to close the last pair of contacts and to complete the circuit across the terminals 30 which will energize the magnet 18 and magnetically hold the switch arm in its circuit closing position.

In starting the operation of the apparatus the switch arm 60 is raised to press down the plunger 61 against the plunger 62, the end of which normally rests in the channel 63 cut in the plunger 61. The stop 62 is normally held in the channel 63 by means of a spring 64. The contacts 23 and 24 will be first closed by this movement of the lever. The contacts 23 and 24 are connected by means of the wire 52 to the armature coils 7 and consequently this circuit is completed first, through the armature coils 7, the circuit being completed through the contact 23 and the wire 53 and returning through the wires 51, 50 and 35. The contacts 21 and 22 are also closed upon the forward movement of the plunger 61. The contacts 21 and 22 operate to close the circuit of the field coil 6 to the battery 30. The field coil 6 is connected to the battery 30 by means of the line 41, and to the contact 21 by means of the wire 55, while the contact 22 is connected to the battery by means of the wires 56 and 42. The contacts 19 and 20 are next closed. They complete the circuit of the primary 26 of the high tension transformer 25. The high tension transformer primary coil 26 is connected on one side to the wires 50 and 35 and on the other to the contact 19 by means of the wire 68 and the contact 20 is connected to the end terminal of the booster transformer 3 by means of the wire 69. The circuits of the armature coils of the synchronous motor, the field coil of the synchronous motor, and the primary coil of the high tension transformer are thus closed in the order named when the lever 60 is lifted and the plunger 61 is pushed in until it engages the plunger 62.

The synchronous motor is then brought up to synchronism by a suitable crank or mechanism, whereupon the current will keep it in its synchronous relation to the current changes. When the rotor and the elements connected therewith are brought to synchronism, the plunger 62 may be pulled down, which will release the plunger 61 and permit the contacts 44 to be closed with the contacts 70 and at the same time the armature 71 is brought into contact with the poles of the magnet 18. This completes the circuit of the storage battery with the commutating brushes 39 and 46, which are connected to the contacts 70. The magnet 18, which is in series in the circuit, also becomes energized, and holds the switch 17 in its closed position. The storage battery is connected to one contact 70 by means of the lines 42 and 43 while the brush 46 is connected to the other contact 70 by means of the line 45. The remaining brush 39 is connected to the storage battery 30 by means of the lines 40 and 41. Thus the circuit from the brushes is completed through the storage battery 30.

Suitable ballast coils and resistance coils may be inserted in different parts of the line as may be desired. The coil 75 controls the release point of the magnet 18. It is a shunt coil of low resistance which reduces the amount of current that passes through the magnet 18, and thus the magnetizing effect of the magnet which acts against the elasticity of the springs 19 to 24 inclusive is reduced. The coil 76 is a high resistance coil to prevent a field or extra current discharge between the contacts 21 and 22 when the circuit is opened.

The structure shown in the figures has a motor for synchronously rotating the commutator and the sparking terminals. The commutator 13, which is mounted on the shaft 8, is constructed substantially like the construction illustrated in my pending application, Serial No. 57,011. Two pairs of sets of brushes 39 and 46, see Fig. 5, are pressed against the commutator to make electrical connection therewith. The part 14 of the commutator is connected to the ring contact 16, and a disk 33 is pressed against the ring to make electrical connection with the ring 16. The disk 33 is supported on a spider 203. It is lifted relative to the spider 203 and is yieldingly forced against the ring 16 by means of the springs 204, which surrounds insulated rods 205 secured to the disk 33 for the purpose of guiding the disk 33 and keeping it in parallel arrangement with respect to the commutator.

The electrode 9 also makes connection with the commutator, it being supported on the dove-tailing portion 15 of the commutator by means of the disk 210. The disk 210 is secured by means of the screws to the segment 15 of the commutator. The disk 210 is provided with terminals 11 which are rotated with the commutator 13 as it passes beneath the brush pairs 39 and 46.

The sparking terminals 11 move in proximity to the fixed terminal 12 shown in Figs. 4 and 5. The fixed terminal 12 may be a plate cut substantially square in form, which permits any one of the four sides of the plate-like fixed terminal 12 to be presented to the terminals 11, giving thereby a considerable period of time during which sparks may be formed between the terminals 11 and 12 to start the arcs between the electrodes 9 and 10. The plate terminal 12 is located in a horizontal plane, that is, in a plane at right angles to the axis of the shaft 1, and may be rotatably adjusted so as to vary the angular relation of one of the edges to the path of movement of the ends of the terminals 11 as they are carried around by the rotation of the plate 210. The plate 12 may be secured in its adjusted position by means of the nut 215. The plate 12 is insulatingly supported in an arm 216, which may be shifted vertically along a rod 217, which is supported on the spider 203, and secured in its adjusted position.

The brushes 46 are supported on the spider 203 by means of the posts 220. The brushes 46 are provided with suitable supports having members for yieldingly pressing the brushes against the commutators in the manner described in my application No. 57,011.

The spider 203 is insulatingly supported on a sleeve 232 located on the boss or neck 223 which forms a part of the casing of the synchronous motor.

The brushes 39 are supported on a spider 230 which is also insulatingly supported on the sleeve 232. The spiders 203 and 230 are secured in position by means of the nut 231 which is threaded on to the sleeve 232. The sleeve 232 is provided with the slot 233 and is split at 234. The parts on each side of the split may be drawn together by means of the threaded rod 235 which threads into one portion of the sleeve 232 and shoulders against the other portion on the opposite side of the split, whereby the sleeve 232 may be clamped on the neck 223 of the casing.

The synchronous motor is located within a casing formed of the shell 229 and end plates 228, which are bolted together by means of the bolts 224.

The direct current field coils 6 are located within the casing thus formed. The armature field 239 is laminated and is secured in position by means of the rings 238, which are locked to the cylinder 229 by means of the pins 237, after the laminations have been securely clamped in position by forcing the rings 238 together. The motor is a combination of a synchronous and induction motor having the rotor 225. It is constructed substantially as described in my said pending application. The upper field pole 264 extends to near the body of the rotor, while the end of the lower one 263 is more remote. By this arrangement a large part of the weight of the rotor is supported and the pressure on the bearings is relieved. The motor operates to keep the commutator 13 and the sparking terminals 11 in synchronism with the changes of the alternating current to which the motor may be connected. The rotor 225 is first brought to synchronism by a suitable mechanism such as the combination worm 225 and the spur gear wheel 227, whereupon the motor will keep the commutator and the spark terminals in synchronism with the current changes.

The non-rotatable electrode 10 is secured to a disk 240. An electrical connection may be made to the electrode 10 through the strip 241, which is secured to the plate 240. The electrodes 9 and 10 are made ring shape and have opposing surfaces of considerable area which keep the arcs formed between the annular electrodes at points on one electrode which are moving at all times substantially at the same velocity to cause uniform wear or burning of the electrodes.

The electrode 10 is provided with a means for causing the separation of the electrodes 9 and 10 a certain adjustable distance. The disk 240 which supports the electrode 10 is connected to a sleeve 242. The upper end of the sleeve 242 is provided with a rack 243, which is operated or lifted by a pinion 244. The pinion 244 is supported on a shaft 276 having bearings in ears 275 formed in a plate 268. The plate is secured to the sleeve 245, which is supported on a plate 266 mounted above the electrodes 9 and 10. A ratchet wheel 247 is connected to the pinion 244.

A plate 248 has a depending lip 249, on which is located a dog 250. A stop 251 is also located on the lip 249 and operates to limit the dog 250 in its movement in one direction. The dog 250 is pressed against the ratchet wheel 247 and the stop 251 by means of the spring 252. The plate 248 is guided in its movements by means of a sleeve 255 which surrounds the sleeve 245. The plate 248 is connected to one end of the sleeve 255. The plate is provided with a pair of rods 256, which extend above the sleeve 242. They are movable through the plate 268. The plates may be separated by cushion washers 264 to prevent jarring of the plates together by the spring 265. A cross bar 257 connects the rods 256 at the top to which they are secured by means of the nuts 258. A lens-shaped knob 259 is connected to the cross bar 257. The knob 259 affords a convenient means for pressing the plate 248 together with the dog 250 downward. The sleeve 255 together with the dog 250 and the knob 259 are lifted by the spring 265. The spring 265 is located intermediate the plate 248 and the plate 266, which is supported by the rods 217. The rods 217 are insulatingly supported on the spiders 203 and 230. The rods 217 are supported in insulated bushings 267 to prevent a short-circuiting between the brushes 39 and 46, which are also connected to the spiders 203 and 230 by means of rods 220.

In order to separate the electrode 10 a predetermined distance from the electrode 9 the knob 259 is pushed downward, which pushes down the plate 248 and the dog 250. This releases the ratchet wheel 247 and allows the ratchet wheel and pinion to be freely rotated by the weight of the electrode 10 which falls until its lower surface strikes the upper surface of the electrode 9. The knob 259 is then released and when the dog 250 is lifted by the spring 265 it engages with a tooth of the ratchet 247 and will rotate the ratchet 247 a certain distance, causing the electrode 10 to lift a certain distance from the electrode 9, which distance is dependent upon the position of the dog on the lip 249 with reference to the rachet wheel when the dog 250 first engages the wheel. By this setting operation the electrodes may be readily placed from time to time in fixed relation with respect to each other, notwithstanding the extent that the electrodes may be burned out by the heat of the arc and also notwithstanding the irregularities that may be formed by reason of want of uniformity of the graphite mixture, of which the electrodes are formed. By this arrangement also the minimum distance between the electrodes as measured between the opposing surfaces of the electrodes will always be the predetermined amount according to the point at which the dog 250 catches a tooth of the wheel 247.

The construction and systems selected and described may be further modified in their arrangement and the manufacture of their parts and in the substitution of elements having equivalent functions and such modifications may be used for many varied purposes and still contain the invention.

Having thus described my invention, what I claim as new, and desire to secure by Letters Patent, is—

1. In an alternating current rectifier, the combination of a commutator, a synchronous motor, a pair of electrodes, one of the electrodes connected to the commutator, and means for automatically moving the other of the electrodes a fixed distance away from the first named electrode.

2. In an alternating current rectifier, the combination of a commutator, a synchronous motor, a pair of electrodes, one of the electrodes connected to the commutator, and a reciprocating means for separating the electrodes a predetermined distance upon a return movement of the reciprocating means.

3. In an alternating current rectifier, the combination of a commutator, a synchronous motor, a pair of electrodes, one of the electrodes connected to the commutator, a reciprocating means for separating the electrodes a predetermined distance upon a return movement of the reciprocating means, and a spring for causing the return movement of the reciprocating means.

4. In an alternating current rectifier, the combination of a commutator, a synchronous motor, a pair of electrodes, one of the electrodes connected to the commutator, a ratchet connected to one of the electrodes, a movable member, and a dog supported on the movable member for engaging the ratchet upon a movement of the member to separate the electrodes a predetermined distance.

5. In an alternating current rectifier, the combination of a commutator, a synchronous motor, a pair of electrodes, one of the electrodes connected to the commutator, a rack connected to one of the electrodes, a pinion for operating on the rack, a ratchet wheel connected to the pinion, a reciprocating member, and a dog located on the reciprocating member for releasing one of the electrodes and lifting the last-named electrode a predetermined distance.

6. In an alternating current rectifier, the combination of a commutator, a synchronous motor, a pair of electrodes, one of the electrodes connected to the commutator, and means for permitting the electrodes to be brought together and for lifting the electrodes a predetermined distance.

7. In an alternating current rectifier, the combination of a commutator, a synchronous motor, a pair of electrodes, one of the electrodes connected to the commutator, and a reciprocating member for releasing one of the electrodes and permitting it to come in contact with the other of the electrodes and separating the electrodes a predetermined distance.

8. In a rectifier, the combination of a synchronous motor, a commutator rotated by the motor, brushes, a pair of electrodes, one of the electrodes connected to the commutator, means for automatically separating the electrodes a predetermined distance, and insulated spiders supported on the casing of the motor for supporting the said means and the brushes.

9. In a rectifier, the combination of a synchronous motor, a commutator rotated by the motor, brushes, a pair of electrodes, one of the electrodes connected to the commutator, means for automatically separating the electrodes a predetermined distance, insulated spiders supported on the casing of the motor for supporting the said means and the brushes, and means for adjusting the spiders relatively to the commutator.

10. In a rectifier, the combination of a pair of electrodes, means for rotating one of the electrodes relatively to the other, spark terminals connected to one of the electrodes, a fixed spark terminal located in the vicinity of the path of movement of the first named spark terminals.

11. In a rectifier, the combination of a pair of electrodes, a movable conductor member located on one of the electrodes, terminals located on the conductor member, and a fixed spark terminal located in the vicinity of the path of movement of the first named terminals.

12. In an alternating current rectifier, a pair of electrodes, a source of current supply, sparking terminals supported on one of the electrodes, means for rotating the last-named electrode and the sparking terminals in synchronism with the current from the said source of current supply, and a fixed sparking terminal located in the vicinity of the path of the first-named sparking terminals.

13. In an alternating current rectifier, a source of current supply, a plurality of spark terminals, means for rotating the spark terminal in synchronism with the current from the said source of current supply, and a rectangular shaped fixed spark terminal located in the vicinity of the path of movement of the first-named terminal.

14. In an alternating current rectifier, the combination of a source of current supply, a spark terminal, means for rotating the spark terminal in synchronism with the current from said source of current supply, a fixed, substantially square spark terminal located in the vicinity of the path of movement of the first-named terminal.

15. In an alternating current rectifier, the combination of a source of current supply, a spark terminal, means for rotating the spark terminal in synchronism with the current from the said source of current supply, and a fixed, substantially square spark terminal located in the vicinity of the path of movement of the first-named terminal, having one of its side edges opposed to the end of the first-named terminal.

16. In an alternating current rectifier, the combination of a source of alternating current supply, a commutator and brushes, means for rotating the commutator in synchronism with the changes of the current, electrodes in the circuit of the brushes, and means for periodically starting arcs between the electrodes.

17. In an alternating current rectifier, the combination of a source of alternating current supply, a commutator and brushes, electrodes in the circuit of the brushes, and a source of high tension current connected to the electrodes for periodically starting arcs between the electrodes.

18. In an alternating current rectifier, the combination of a source of alternating current supply, a commutator and brushes, electrodes in the circuit of the brushes, spark terminals, a source of high tension current connected to the electrodes through the spark terminals for periodically starting arcs between the electrodes.

19. In an alternating current rectifier, the combination of a source of alternating current supply, a commutator and brushes, spark terminals connected to a rotating means, a fixed spark terminal located in the vicinity of the path of movement of the first-named spark terminal, and a source of high tension current connected to the electrodes through the said spark terminals for periodically starting arcs between the electrodes.

20. In an alternating current rectifier, the combination of a source of alternating current supply, a commutator and brushes, spark terminals connected to a rotating means, a fixed spark terminal located in the vicinity of the path of movement of the first-named spark terminals, and angularly so located with respect to the commutator that each spark terminal will pass a fixed terminal when the brushes have passed the leading edges of the rotating commutator sections, and a source of high tension current connected to the electrodes through the spark terminals for periodically starting arcs between the electrodes.

21. In an alternating current rectifier, the combination of a source of alternating current supply, a commutator and brushes, electrodes in the circuit of the brushes, a source of high tension current connected to the electrodes for periodically starting arcs between the electrodes, and means in the circuit of the electrodes for counteracting the effect of the source of high tension current.

22. In an alternating current rectifier, a source of alternating current supply, electrodes connected to the source, spark terminals connected to the electrodes, means for rotating the spark terminals synchronously with the current changes, a transformer having a secondary for producing a high potential current connected to the spark terminals and the electrodes, and a winding for counteracting the effect of the first-named secondary when arcs have been established between the electrodes by the first-named secondary.

In testimony whereof, I have hereunto signed my name to this specification.

THOMAS J. MURPHY.